(12) United States Patent
Choi

(10) Patent No.: US 12,152,930 B2
(45) Date of Patent: Nov. 26, 2024

(54) BLASTING DEVICE AND METHOD THEREOF FOR MEASURING BLAST VIBRATION

(71) Applicant: HANWHA CORPORATION, Seoul (KR)

(72) Inventor: Jeong Ho Choi, Cheongju-si (KR)

(73) Assignee: HANWHA CORPORATION, Seoul (KR)

( * ) Notice: Subject to any disclaimer, the term of this patent is extended or adjusted under 35 U.S.C. 154(b) by 0 days.

(21) Appl. No.: 18/008,756

(22) PCT Filed: Oct. 7, 2022

(86) PCT No.: PCT/KR2022/015171
§ 371 (c)(1),
(2) Date: Dec. 7, 2022

(87) PCT Pub. No.: WO2023/128164
PCT Pub. Date: Jul. 6, 2023

(65) Prior Publication Data
US 2024/0230398 A1 Jul. 11, 2024

(30) Foreign Application Priority Data
Dec. 30, 2021 (KR) .......................... 10-2021-0192376

(51) Int. Cl.
*G01H 1/00* (2006.01)
*F42D 5/00* (2006.01)
(52) U.S. Cl.
CPC ................. *G01H 1/00* (2013.01); *F42D 5/00* (2013.01)

(58) Field of Classification Search
CPC .......... G01H 1/00; F42D 5/00; G01N 29/045; G01N 29/14; G01N 29/22; G01N 29/4418; G01N 29/4436
See application file for complete search history.

(56) References Cited

U.S. PATENT DOCUMENTS

| 8,185,343 B1 * | 5/2012 | Fitzgerald | G01V 1/223 |
| | | | 702/188 |
| 2024/0035381 A1 * | 2/2024 | Gao | F42D 1/055 |
| 2024/0044628 A1 * | 2/2024 | Jeong | G01S 17/02 |

FOREIGN PATENT DOCUMENTS

| JP | 2016-196970 A | 11/2016 |
| JP | 2018-100823 A | 6/2018 |

* cited by examiner

*Primary Examiner* — Suman K Nath
(74) *Attorney, Agent, or Firm* — WHDA, LLP

(57) ABSTRACT

A blasting device and a method thereof for measuring blasting vibration are proposed. The device includes a blasting signal recognition unit configured to recognize a transmission point of time of a blasting start signal and a transmission point of time of a blasting end signal of a blaster, a vibration measurement data acquisition unit configured to acquire vibration measurement data from a vibration measurement sensor connected to the blasting device when blasting work is started according to the recognized blasting start signal, and a blasting vibration information generation unit configured to generate blasting vibration information on the basis of the acquired vibration measurement data and blasting information pre-stored in the blasting device when the blasting work is ended according to the recognized blasting end signal.

7 Claims, 2 Drawing Sheets

BLASTING DEVICE AND METHOD THEREOF FOR MEASURING BLAST VIBRATION

TECHNICAL FIELD

The present disclosure relates to a blasting device and a method thereof for measuring blasting vibration and, more particularly, to a blasting device and a method thereof for measuring blasting vibration, wherein when blasting work is started according to a blasting start signal of a blaster, vibration measurement data is acquired from a vibration measurement sensor connected to a blasting device, so as to measure the blasting vibration for generating blasting vibration information.

BACKGROUND ART

The most effective method for crushing bedrock is a blasting method using explosives, which has been widely used since ancient times.

However, in the case of blasting by explosives, various environmental problems occur due to vibration of the ground, scattering of rock fragments, propagation of explosive sound, etc. In particular, according to the allowable standards for blasting noise and vibration (South Korean Ministry of Construction and Transportation, 2002), it is analyzed that even a low vibration may seriously damage a human body or livestock such as cattle, pigs, and roe deer.

The vibration regulation standard of the South Korean Ministry of Environment is V=0.09 cm/sec (70 dB), and in the case of blasting work performed in downtown areas, this standard cannot ever be completely satisfied, so complaints and lawsuits due to the blasting work are constantly occurring.

Accordingly, it is required to perform measurement of blasting vibration to determine vibration of the ground and structures, the vibration occurring in an area around a workplace and caused by blasting of excavation work and the like according to construction, so as to clearly determine impacts that may be caused by the blasting. In order to satisfy this requirement, a blasting vibration measurement device has been proposed.

After being separately installed, in order to set a triggering point of time for acquiring the blasting vibration, the blasting vibration measurement device is usually operated in a way of recognizing a starting point of time when a predetermined intensity or more of vibration is generated.

Accordingly, there is inconvenience due to the separate installation, and also there are problems in that measurement often fails due to a triggering setting error, vibration unrecognition, or the like, thereby causing inconvenience and confusion.

In this regard, Korean Patent Application Publication No. 2007-0121442 discloses a "WIRELESS BLASTING VIBRATION MEASUREMENT SYSTEM".

DISCLOSURE

Technical Problem

The present disclosure is devised to solve the above described problems, and an objective of the present disclosure is to provide a blasting device and a method thereof for measuring blasting vibration, wherein when blasting work is started according to a blasting start signal of a blaster, vibration measurement data is acquired from a vibration measurement sensor connected to a blasting device, so as to measure the blasting vibration for generating blasting vibration information, and when an end of the blasting work is recognized, blasting vibration information is generated on the basis of the acquired vibration measurement data and blasting information pre-stored in the blasting device.

Technical Solution

According to the present disclosure for achieving the above objective, there is provided a blasting device for measuring blasting vibration, the device including: a blasting signal recognition unit configured to recognize a blasting start signal and a blasting end signal; a vibration measurement data acquisition unit configured to acquire vibration measurement data from a vibration measurement sensor connected to the blasting device when blasting work is started according to the recognized blasting start signal; and a blasting vibration information generation unit configured to generate blasting vibration information on the basis of the acquired vibration measurement data and blasting information pre-stored in the blasting device when the blasting work is ended according to the recognized blasting end signal.

In addition, the vibration measurement data acquisition unit may acquire the vibration measurement data, according to X, Y, and Z coordinates during blasting, from the vibration measurement sensor built into the blasting device or externally connected through a separate communication method.

In addition, the blasting vibration information generation unit may generate the blasting vibration information by using the acquired vibration measurement data, detonator time-in-milliseconds interval data pre-stored in the blasting device, and the blasting information that includes a location of the blasting device and locations of a plurality of blasting holes.

In addition, the blasting vibration information generation unit may generate the blasting vibration information including blasting vibration transmission rates and patterns on the basis of the acquired vibration measurement data and the blasting information pre-stored in the blasting device.

According to the present disclosure for achieving the above objective, there is provided a blasting method for measuring blasting vibration, the method including: recognizing, by a blasting signal recognition unit, a blasting start signal and a blasting end signal; acquiring, by a vibration measurement data acquisition unit, vibration measurement data from a vibration measurement sensor connected to a blasting device when blasting work is started according to the recognized blasting start signal; and generating, by a blasting vibration information generation unit, blasting vibration information on the basis of the acquired vibration measurement data and blasting information pre-stored in the blasting device when the blasting work is ended according to the recognized blasting end signal.

In addition, in the acquiring of the vibration measurement data from the vibration measurement sensor connected to the blasting device when the blasting work is started according to the recognized blasting start signal, the vibration measurement data according to X, Y, and Z coordinates during blasting may be acquired from the vibration measurement sensor built into the blasting device or externally connected through a separate communication method.

In addition, in the generating of the blasting vibration information on the basis of the acquired vibration measurement data and the blasting information pre-stored in the blasting device when the blasting work is ended according to the recognized blasting end signal, the blasting vibration information, including blasting vibration transmission rates and patterns, may be generated by using the acquired vibration measurement data, detonator time-in-milliseconds interval data pre-stored in the blasting device, and the blasting information that includes a location of the blasting device and locations of a plurality of blasting holes.

Advantageous Effects

The present disclosure relates to the blasting device and the method thereof for measuring the blasting vibration, wherein when the blasting work is started according to the blasting start signal of the blaster, the vibration measurement data is acquired from the vibration measurement sensor connected to the blasting device, so as to measure the blasting vibration for generating the blasting vibration information, and when the end of the blasting work is recognized, the blasting vibration information is generated on the basis of the acquired vibration measurement data and the blasting information pre-stored in the blasting device, whereby there is an effect that the measurement of the blasting vibration may be facilitated and more accurate blasting vibration transmission speeds and patterns may be acquired.

In this way, in the present disclosure, the vibration measurement data is acquired on the basis of the blasting start signal of the blaster, whereby there is an effect that problems of inability to measure due to the failure to observe the blasting start point of time, which is a limitation of the separately provided blasting measurement device, do not occur.

BEST MODE

Figure 1:
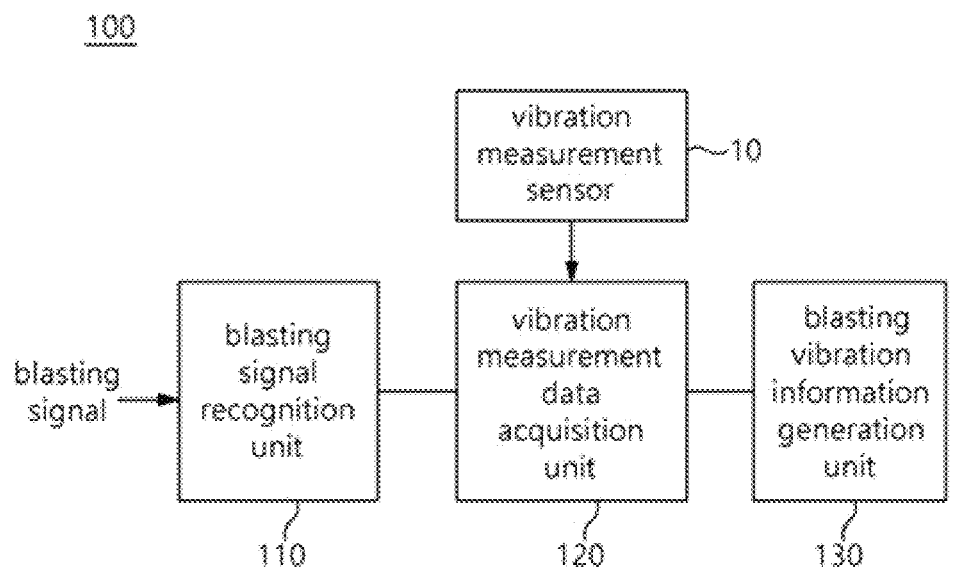
FIG. 1 is a view illustrating a configuration of a blasting device for measuring blasting vibration according to the present disclosure.

In the present disclosure, various modifications may be made and various exemplary embodiments may be provided, and specific exemplary embodiments will be illustrated in the drawings and described in detail.

However, this is not intended to limit the present disclosure to a particular disclosed form. On the contrary, the present disclosure is to be understood to include all various alternatives, equivalents, and substitutes that may be included within the idea and technical scope of the present disclosure. While describing each drawing, similar reference numerals have been used for similar components.

When a component is described as being "connected", "coupled", or "linked" to another component, that component may be directly connected, coupled, or linked to that other component. However, it should be understood that yet another component between each of the components may be present. In contrast, it should be understood that when a component is referred to as being "directly coupled" or "directly connected" to another component, there are no intervening components present.

The terminology used herein is for the purpose of describing particular exemplary embodiments only and is not intended to be limiting. As used herein, the singular forms are intended to include the plural forms as well, unless the context clearly indicates otherwise. In addition, it will be further understood that the terms "comprise", "include", "have", etc. when used in the present application, specify the presence of stated features, integers, steps, operations, elements, components, and/or combinations of them but do not preclude the possibility of the presence or addition of one or more other features, integers, steps, operations, elements, components, and/or combinations thereof.

Hereinafter, preferred exemplary embodiments of the present disclosure will be described in more detail with reference to the accompanying drawings. Hereinafter, the same reference numerals are used for the same components in the drawings, and duplicated descriptions for the same components are omitted.

FIG. 1 is a view illustrating a configuration of a blasting device for measuring blasting vibration according to the present disclosure.

Describing with reference to FIG. 1, the blasting device 100 for measuring the blasting vibration according to the present disclosure largely includes a blasting signal recognition unit 110, a vibration measurement data acquisition unit 120, and a vibration information generation unit 130. Such a blasting device is equipment that is disposed in a short distance from a blasting site at a time of blasting.

The blasting signal recognition unit 110 recognizes a blasting start signal and a blasting end signal.

The blasting start signal may be acquired as a blasting start signal transmitted from the blasting equipment at the time of blasting, and the blasting end signal may be acquired by using an equation, such as Blasting start signal transmission time+Last detonator setting time-in-milliseconds (i.e., delay time)+Buffer time.

When blasting work is started according to the recognized blasting start signal, the vibration measurement data acquisition unit 120 acquires vibration measurement data from a vibration measurement sensor 10 connected to the blasting device.

The vibration measurement data acquisition unit 120 may acquire the vibration measurement data by digitizing the measured values of X, Y, and Z coordinates during the blasting from the vibration measurement sensor 10 built into the blasting device or externally connected through a separate communication method.

The blasting vibration information generation unit 130 generates blasting vibration information on the basis of the vibration measurement data acquired according to the recognized blasting end signal and the blasting information pre-stored in the blasting device.

The blasting vibration information generation unit 130 may immediately overlay the acquired vibration measurement data and the detonator time-in-milliseconds interval data pre-stored in the blasting device, and may generate blasting vibration information by using the blasting information that includes a location of the blasting device and locations of a plurality of blasting holes.

That is, the blasting vibration information generation unit 130 may generate the blasting vibration information including blasting vibration transmission rates and patterns on the basis of the acquired vibration measurement data and the blasting information pre-stored in the blasting device.

Figure 2:
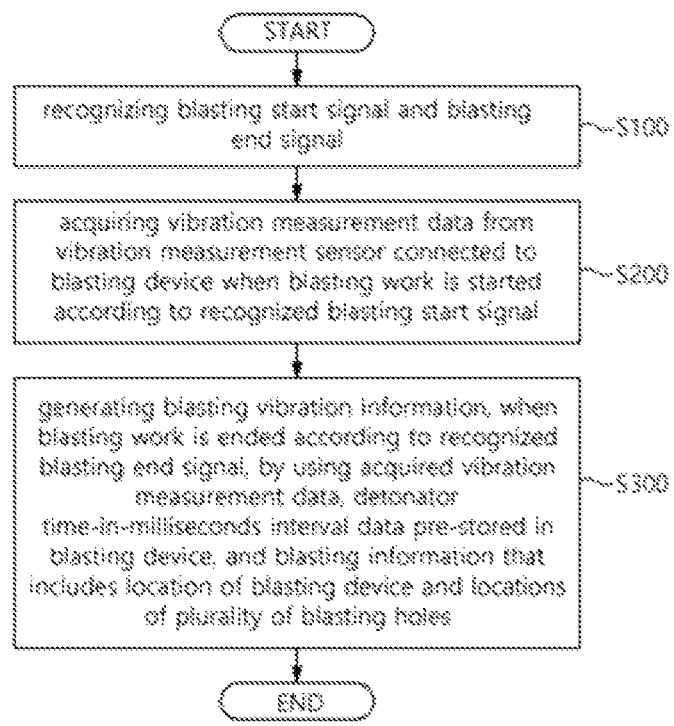
FIG. 2 is a flowchart illustrating a sequence of a blasting method for measuring blasting vibration according to the present disclosure.

FIG. 2 is a flowchart illustrating a sequence of a blasting method for measuring blasting vibration according to the present disclosure.

Describing with reference to FIG. 2, the blasting method for measuring the blasting vibration according to the present disclosure uses the blasting device for measuring the blasting vibration according to the present disclosure described above, and the duplicated description below will be omitted.

First, in step S100, a transmission point of time of a blasting start signal of a blaster and a transmission point of time of a blasting end signal of the blaster are recognized.

Next, in step S200, when blasting work is started according to the recognized blasting start signal, vibration measurement data is acquired from a vibration measurement sensor connected to the blasting device.

In step S200, the vibration measurement data may be acquired by digitizing measured values of X, Y, and Z coordinates during blasting from the vibration measurement sensor built into the blasting device or externally connected through a separate communication method.

Next, in step S300, blasting vibration information is generated on the basis of the vibration measurement data acquired according to the recognized blasting end signal and the blasting information pre-stored in the blasting device.

In step S300, the blasting vibration information may be generated by using the acquired vibration measurement data, detonator time-in-milliseconds interval data pre-stored in the blasting device, and the blasting information that includes a location of the blasting device and locations of a plurality of blasting holes.

That is, in step S300, the blasting vibration information including blasting vibration transmission speeds and patterns may be generated on the basis of the acquired vibration measurement data and the blasting information pre-stored in the blasting device.

As described above, the functional operation and the embodiments related to the present subject matter, which are described in the present specification, may be implemented in a digital electronic circuit or computer software, firmware, hardware, or a combination of one or more thereof, including the structures and structural equivalents thereof, which are disclosed herein.

The embodiments of the subject matter described herein may be implemented as one or more computer program products, i.e., one or more modules related to computer program instructions encoded on a tangible program medium for execution by or for controlling the operation of a data processing device. The tangible program medium may be a radio wave signal or a computer-readable medium. The radio wave signal is a signal generated to encode information for transmission to an appropriate receiver device for execution by a computer, that is, for example, an artificially generated signal such as a machine-generated electrical, optical, or electromagnetic signal. The computer-readable medium may be a machine-readable storage device, a machine-readable storage substrate, a memory device, a combination of materials that affect a machine-readable radio wave signal, or a combination of one or more thereof.

Additionally, the logic flows and structural block diagrams described in the present patent document are intended to describe corresponding functions supported by the disclosed structural means and corresponding actions and/or specific methods supported by the disclosed steps, and may also be used to implement corresponding software structures and algorithms and their equivalents.

In addition, the present description presents the best mode of the present disclosure, and provides examples for describing the present disclosure and for enabling those skilled in the art to make and use the present disclosure. The specification written in this way is not intended to limit the present disclosure to the specific terms presented.

Accordingly, although the present disclosure has been described in detail with reference to the above-described examples, those skilled in the art can make modifications, changes, and deformation to the present examples without departing from the scope of the present disclosure. In short, in order to achieve the intended effect of the present disclosure, it is not necessary to separately include all the functional blocks shown in the drawings or follow all the orders shown in the drawings. It should be noted that even though all the functional blocks are separately included or all the orders shown in the drawings are followed as they are shown, the corresponding functional blocks and orders may fall within the technical scope of the present invention described in the claims.

The invention claimed is:

1. A blasting device for measuring blasting vibration, the device comprising:
   a blasting signal recognition unit configured to recognize a blasting start signal and a blasting end signal;
   a vibration measurement data acquisition unit configured to acquire vibration measurement data from a vibration measurement sensor connected to the blasting device when blasting work is started according to the recognized blasting start signal; and
   a blasting vibration information generation unit configured to generate blasting vibration information on the basis of the acquired vibration measurement data and blasting information pre-stored in the blasting device when the blasting work is ended according to the recognized blasting end signal,
   wherein the blasting vibration information generation unit immediately overlays the acquired vibration measurement data and detonator time-in-milliseconds interval data pre-stored in the blasting device and generates the blasting vibration information by using the blasting information that includes a location of the blasting device and locations of a plurality of blasting holes.

2. The device of claim 1, wherein the vibration measurement data acquisition unit acquires the vibration measurement data, according to X, Y, and Z coordinates during blasting, from the vibration measurement sensor built into the blasting device or externally connected through a separate communication method.

3. The device of claim 1, wherein the blasting vibration information generation unit generates the blasting vibration information by using the acquired vibration measurement data, the detonator time-in-milliseconds interval data pre-stored in the blasting device, and the blasting information that comprises the location of the blasting device and the locations of the plurality of blasting holes.

4. The device of claim 1, wherein the blasting vibration information generation unit generates the blasting vibration information comprising blasting vibration transmission rates and patterns on the basis of the acquired vibration measurement data and the blasting information pre-stored in the blasting device.

5. A blasting method for measuring blasting vibration, the method comprising:
   recognizing, by a blasting signal recognition unit, a blasting start signal and a blasting end signal;
   acquiring, by a vibration measurement data acquisition unit, vibration measurement data from a vibration measurement sensor connected to a blasting device when blasting work is started according to the recognized blasting start signal; and
   generating, by a blasting vibration information generation unit, blasting vibration information on the basis of the acquired vibration measurement data and blasting information pre-stored in the blasting device when the blasting work is ended according to the recognized blasting end signal, wherein, in the generating of the blasting vibration information on the basis of the acquired vibration measurement data and the blasting information pre-stored in the blasting device when the blasting work is ended according to the recognized blasting end signal, the blasting vibration information generation unit immediately overlays the acquired vibration measurement data and detonator time-in-milliseconds interval data pre-stored in the blasting device and generates the blasting vibration information by using the blasting information that includes a location of the blasting device and locations of a plurality of blasting holes.

6. The device of claim 5, wherein, in the acquiring of the vibration measurement data from the vibration measurement sensor connected to the blasting device when the blasting work is started according to the recognized blasting start signal, the vibration measurement data according to X, Y, and Z coordinates during blasting is acquired from the vibration measurement sensor built into the blasting device or externally connected through a separate communication method.

7. The device of claim 5, wherein, in the generating of the blasting vibration information on the basis of the acquired vibration measurement data and the blasting information pre-stored in the blasting device when the blasting work is ended according to the recognized blasting end signal, the blasting vibration information, comprising blasting vibration transmission rates and patterns, is generated by using the acquired vibration measurement data, the detonator time-in-milliseconds interval data pre-stored in the blasting device, and the blasting information that comprises the location of the blasting device and the locations of the plurality of blasting holes.

* * * * *